United States Patent

Wagner et al.

Patent Number: 5,966,092
Date of Patent: Oct. 12, 1999

[54] RADAR SYSTEM, IN PARTICULAR MOTOR VEHICLE RADAR SYSTEM

[75] Inventors: Klaus-Peter Wagner, Stuttgart; Klaus Winter, Schwieberdingen; Heinz Pfizenmaier, Leonberg, all of Germany

[73] Assignee: Robert Bosch GmbH, Stuttgart, Germany

[21] Appl. No.: 08/875,584

[22] PCT Filed: Oct. 11, 1996

[86] PCT No.: PCT/DE96/01945

§ 371 Date: Jul. 7, 1997

§ 102(e) Date: Jul. 7, 1997

[87] PCT Pub. No.: WO97/20229

PCT Pub. Date: Jun. 5, 1997

[30] Foreign Application Priority Data

Nov. 24, 1995 [DE] Germany ............................ 195 43 813

[51] Int. Cl.⁶ ............................ G01S 13/93; G01S 13/48
[52] U.S. Cl. ............................ 342/70; 342/133; 342/139; 342/141; 342/146
[58] Field of Search .................... 342/70, 71, 72, 342/126, 133, 135, 139, 140, 141, 146, 147

[56] References Cited

U.S. PATENT DOCUMENTS

| | | | |
|---|---|---|---|
| 5,023,617 | 6/1991 | Deering | 342/70 |
| 5,757,307 | 5/1998 | Nakatani et al. | 342/70 |
| 5,757,308 | 5/1998 | Lissel et al. | 342/70 |

FOREIGN PATENT DOCUMENTS 2 290 000  12/1995  Germany.

OTHER PUBLICATIONS

"Radar Handbook", by Merrill I. Skolnik.

*Primary Examiner*—John B. Sotomayor
*Attorney, Agent, or Firm*—Michael J. Striker

[57] ABSTRACT

In a radar system, which is used particularly in motor vehicles, the angle at which a detected radar target is located are determined by providing that echo signals of the radar target are picked up via at least two reception channels, and their amplitudes are standardized and compared with standardized values, stored in memory, of a duplex antenna graph of the radar system.

10 Claims, 6 Drawing Sheets

FLOW CHART FOR ANGLE DETERMINATION ACCORDING TO ALGORITHM 1

RADAR SYSTEM, IN PARTICULAR MOTOR VEHICLE RADAR SYSTEM

BACKGROUND OF THE INVENTION

The present invention involves a method for determining an azimuth and/or elevation angle, in which a radar target is located relative to a reference system, and to a radar system based on this. The radar system itself preferably serves as the reference system. Known methods for angle determination are described for instance in "Radar Handbook" by M. Skolnik.

One widely used option is accordingly the use of an antenna with an antenna lobe sharply focused in the plane of the angle sought; the lobe is swiveled mechanically for observing or measuring an angular range. From the position of the antenna at the moment when the reflection of a radar target is received, the angle of the radar target can be determined. A disadvantage of this method is the mechanical rotation of the antenna, which on the one hand involves mechanical wear and on the other takes a comparatively long time because of the inertia of the masses moved. To avoid these disadvantages, a phased array antenna can be used, in which the associated antenna lobe is swiveled electronically. However, this requires of a sharp focusing of many active, phase-controlled transmission/reception elements, which in turn requires comparatively major effort and expense to achieve. It is moreover common to both methods that the observed angular range is scanned sequentially. Depending on the scanning speed, this can worsen the accuracy of the angle measurement.

Another principle for angle determination, also described by Skolnik, is known as the monopulse method. It uses an antenna that has at least two only partly overlapping antenna lobes, located in the plane of the angle sought. The reflections of the detected radar target are now received via each of the at least two antenna lobes. For determining the angle, in the so-called phase monopulse the phase difference among the received reflections from all the antenna lobes is evaluated. In the so-called amplitude monopulse, one differential signal and one summation signal each is formed from the reflections received via the individual antenna lobes. The quotient of the two signals depends approximately linearly on the angle of the radar target detected. A disadvantage of both variants of the monopulse method, however, is that the determined angle of a radar target is unequivocal only within existing limits. Reflections from radar targets that are located outside the unequivocal angular range are misinterpreted in this method. Moreover, the amplitude monopulse method particularly requires approximately identical antenna lobes arranged symmetrically to one another. This in turn means comparatively major effort and expense for producing and maintaining the antenna.

SUMMARY OF THE INVENTION

The object of the present invention is accordingly to propose a method and a radar system based on it that offers an unequivocal, economically achievable way of determining an angle of a radar target. According to the invention, this object is attained with a multiple-beam, and in particular a triple-beam radar system, whose entire duplex antenna graph, defined hereinafter, is stored in memory in the form of standardized values, which can correspond to power, voltage, field intensity or level indications or the like. "Multiple-beam" here means that the radar system picks up a reflected radar signal via a plurality of antenna lobes, that is, at least two antenna lobes, and respectively connected reception channels. The angle of a detected radar target can be determined by comparing the amplitudes of the reflection signals received in the at least two channels with the values stored in memory for the duplex antenna graph. The term "duplex antenna graph" here means that unlike a conventional antenna graph, the outbound and return path of a radar signal, in other words the transmission and reception characteristics of the antenna, are input simultaneously.

In the method of the invention, it becomes unnecessary to have exactly symmetrical antenna lobes. Moreover, the angle determined for a detected radar target is unequivocal over the entire measurement range. As further advantages, the method of the invention furnishes a highly conclusive quality criterion with respect to an angle decision that has been made and is suitable in particular for parallel processing of the reflections of the individual antenna lobes. Last but not least, the effort and expense for the angle determination is shifted from the hardware of the radar system to its software, which is becoming less and less expensive in view of modern processor and memory technology.

BRIEF DESCRIPTION OF THE DRAWING

Two exemplary embodiments of the invention will be described below in conjunction with a drawing, in which

FIG. 3 is a standardized duplex antenna graph of the triple-beam radar system over the same angle index a;

DESCRIPTION OF THE PREFERRED EMBODIMENTS

Figure 1:
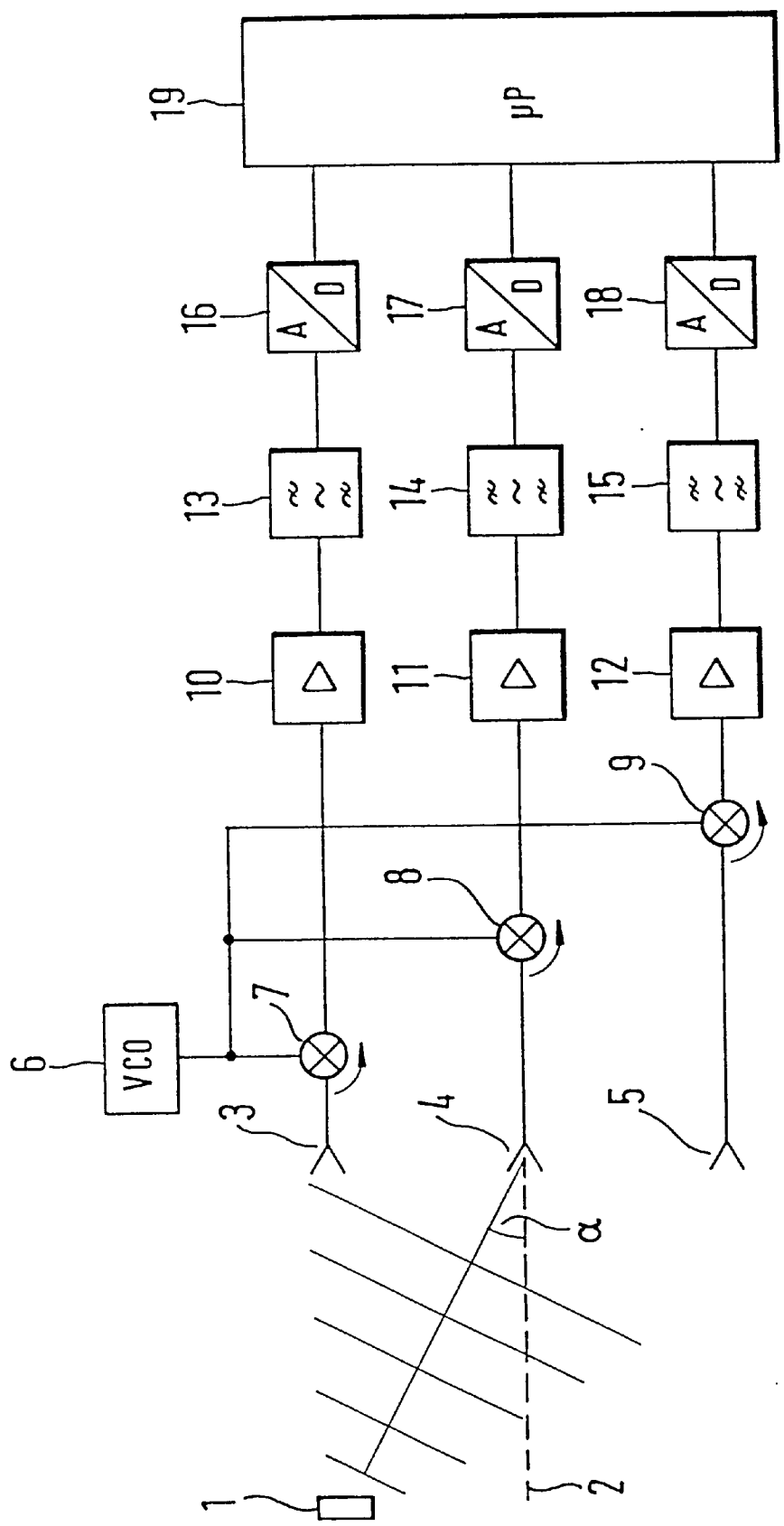
FIG. 1 is a block circuit diagram of a triple-beam radar system for performing the method of the invention.

In FIG. 1, three transmission/reception elements 3, 4, 5 are connected to three so-called dual ratrace rings 7, 8, 9. The dual ratrace rings combine the function of a mixer with the function of a transmission/reception shunt or circulator and are described in detail in terms of their function and structure for example in British Patent Application GB 22 90 000. Moreover, each of the dual ratrace rings 7, 8, 9 receives the output signal of a voltage-controlled oscillator 6. The output signal of each of the three dual ratrace rings 7, 8, 9 is carried via respective amplifiers 10, 11, 12 and filters 13, 14, 15 to respective analog/digital converters 16, 17, 18. These converters are connected at their output to an evaluating computer processor 19. Reference numeral 1 indicated a detected radar target, from which a wave front is reflected to the transmission/reception elements 3, 4, 5 at an angle a relative to the optical axis 2 of the radar system.

Figure 2:
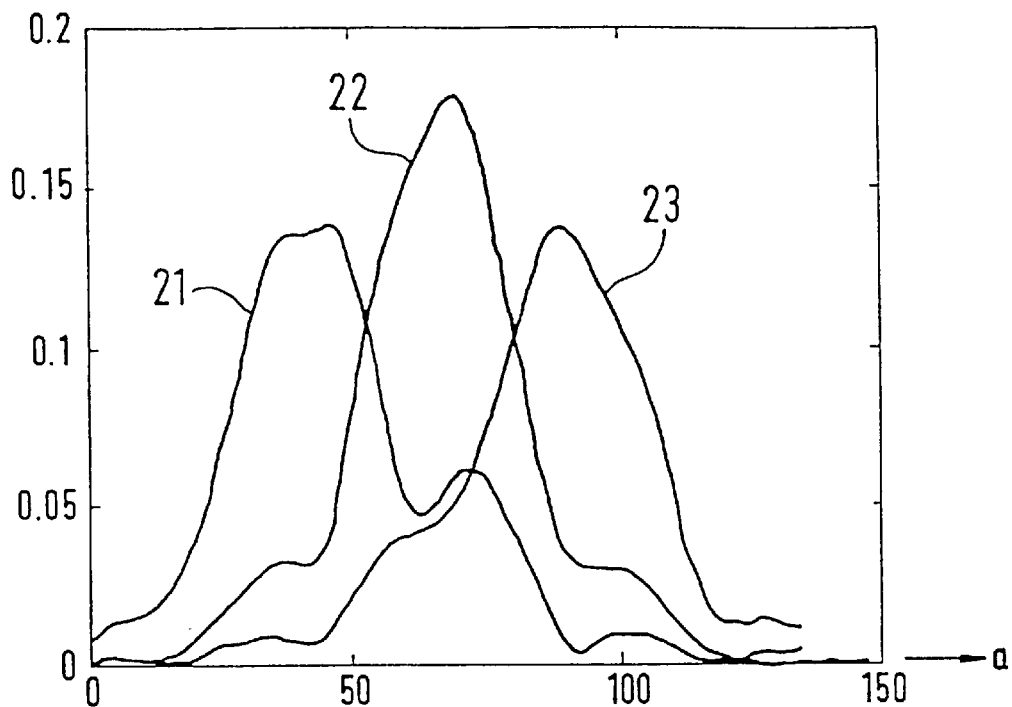
FIG. 2 is a duplex antenna graph of triple-beam radar system over an angle index a characterizing the respective measurement angle α.

In FIG. 2, a duplex antenna graph of a triple-beam radar system is shown. The quantitative amount of the voltage, power or field intensity, for instance, is plotted over an angle index a that represents the angle of incidence. The curve 21 represents the quantitative value picked up at the left reception element 5. The curve 22 represents the quantitative value picked up at the middle reception element 4. The curve 23 represents the quantitative value picked up at the right reception element 3. For purposes of exact terminology, these quantitative values will hereinafter be called graph values.

Figure 3:
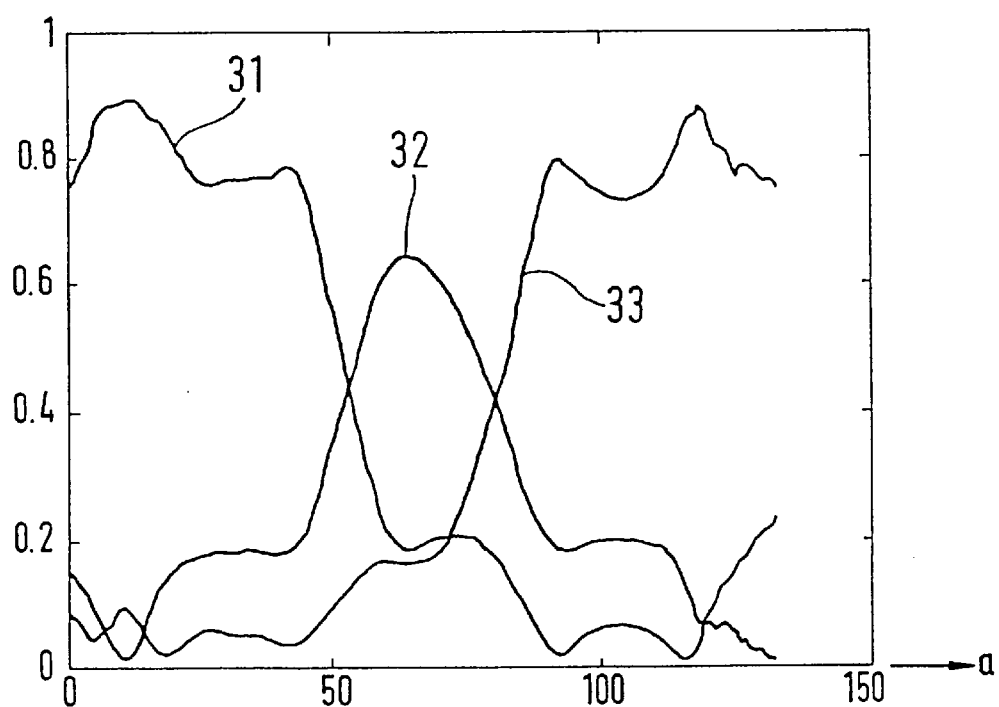

In FIG. 3, the duplex antenna graph of FIG. 2 is shown in the standardized representation. The standardizing can be done in various ways. Curve 31 shows the standardized graph values for the left antenna lobe, that is, for the left transmission/reception element 5. Curves 32 and 33 show the standardized graph values for the middle and right antenna lobes, that is, for the transmission/reception elements 4 and 3, respectively The standardization is effected preferably with a summation standard. That is, each graph value of the curves 21, 22, 23 is divided by a standardizing value sum(a), which is obtained as follows:

$$sum(a)=l(a)+m(a)+r(a)$$

in which the terms have the following meanings:

l(a) is the graph value for the left curve at angle index a m(a) is the graph value for the middle curve at angle index a r(a) is the graph value for the right curve at angle index a.

Thus the graph values of the three standardized curves 31, 32, 33 are obtained as follows:

$$nl(a)=l(a)/sum(a)$$

$$nm(a)=m(a)/sum(a)$$

$$nr(a)=r(a)/sum(a)$$

in which the terms have the following meanings:

nl(a) is the standardized graph value for the left curve at angle index a nm(a) is the standardized graph value for the middle curve at angle index a nr(a) is the standardized graph value for the right curve at angle index a.

The sum of the graph values of all the curves 31–33, for each angle index at this standardization, yields a one, or in general terms a constant value. Alternatively, standardization can be done for instance with a product standard, in which the product of all the graph values of all the standardized curves must be equal to a constant value.

The following FIGS. 4–7 relate to a first exemplary embodiment of the invention, which will now be explained in detail. In a radar system accordance with FIG. 1, a transmission signal is generated by an oscillator 6 and broadcast via the transmission/reception elements 3, 4, 5 A radar target 1, which is illuminated by the transmitted signal, generates a reflection signal that is picked up via the reception elements 3, 4, 5 of the radar system. Depending on the angular position of the radar target and the shape of the antenna lobes, different amplitude values are then generated in the individual three transmission/reception elements 3, 4, 5. The received amplitude values are mixed into a lower frequency position via the mixer function of the dual ratrace rings 7, 8, 9 and then supplied to the amplifiers 10, 11, 12. After a dynamic and anti-aliasing filtration 13, 14, 15 and D/A conversion 16, 17, 18, they reach the evaluating computer 19 in the form of digital values.

TABLE I

AMPLITUDES VERSUS ANGLE INDICES

| LEFT | | MIDDLE | | RIGHT | |
|---|---|---|---|---|---|
| Amplitude | Angle Index | Amplitude | Angle Index | Amplitude | Angle Index |
| 0.7574 | 97.0000 | 0.3698 | 82.0000 | 0.7689 | 35.0000 |
| 0.7594 | 133.0000 | 0.3736 | 51.0000 | 0.7689 | 1.0000 |
| 0.7606 | 111.0000 | 0.3988 | 81.0000 | 0.7694 | 44.0000 |
| 0.7649 | 132.0000 | 0.4065 | 52.0000 | 0.7699 | 38.0000 |
| 0.7656 | 134.0000 | 0.4246 | 80.0000 | 0.7747 | 39.0000 |
| 0.7659 | 96.0000 | 0.4373 | 53.0000 | 0.7769 | 24.0000 |
| 0.7681 | 112.0000 | 0.4480 | 79.0000 | 0.7813 | 40.0000 |
| 0.7755 | 90.0000 | 0.4682 | 54.0000 | 0.7839 | 23.0000 |
| 0.7764 | 131.0000 | 0.4712 | 78.0000 | 0.7846 | 43.0000 |
| 0.7764 | 95.0000 | 0.4958 | 55.0000 | 0.7885 | 41.0000 |
| 0.7787 | 113.0000 | 0.4959 | 77.0000 | 0.7893 | 42.0000 |
| 0.7810 | 127.0000 | 0.5190 | 76.0000 | 0.7949 | 2.0000 |
| 0.7853 | 130.0000 | 0.5253 | 56.0000 | 0.7963 | 22.0000 |
| 0.7868 | 129.0000 | 0.5389 | 75.0000 | 0.8029 | 3.0000 |
| 0.7877 | 94.0000 | 0.5526 | 57.0000 | 0.8088 | 21.0000 |
| 0.7931 | 128.0000 | 0.5560 | 74.0000 | 0.8213 | 20.0000 |
| 0.7932 | 114.0000 | 0.5733 | 73.0000 | 0.8301 | 4.0000 |
| 0.7934 | 91.0000 | 0.5772 | 58.0000 | 0.8351 | 19.0000 |
| 0.7967 | 93.0000 | 0.5898 | 72.0000 | 0.8498 | 18.0000 |
| 0.8013 | 92.0000 | 0.5986 | 59.0000 | 0.8594 | 5.0000 |
| 0.8048 | 126.0000 | 0.6048 | 71.0000 | 0.8618 | 16.0000 |
| 0.8076 | 125.0000 | 0.6145 | 60.0000 | 0.8621 | 17.0000 |
| 0.8124 | 115.0000 | 0.6169 | 70.0000 | 0.8710 | 15.0000 |
| 0.8125 | 124.0000 | 0.6262 | 69.0000 | 0.8755 | 6.0000 |
| 0.8270 | 123.0000 | 0.6301 | 61.0000 | 0.8813 | 14.0000 |
| 0.8339 | 116.0000 | 0.6340 | 68.0000 | 0.8817 | 7.0000 |
| 0.8460 | 122.0000 | 0.6411 | 62.0000 | 0.8868 | 9.0000 |
| 0.8570 | 117.0000 | 0.6421 | 67.0000 | 0.8872 | 8.0000 |
| 0.8652 | 121.0000 | 0.6469 | 66.0000 | 0.8898 | 13.0000 |
| 0.8702 | 119.0000 | 0.6477 | 63.0000 | 0.8917 | 10.0000 |
| 0.8703 | 118.0000 | 0.6499 | 65.0000 | 0.8927 | 12.0000 |
| 0.8817 | 120.0000 | 0.6513 | 64.0000 | 0.8980 | 11.0000 |

Figure 4:
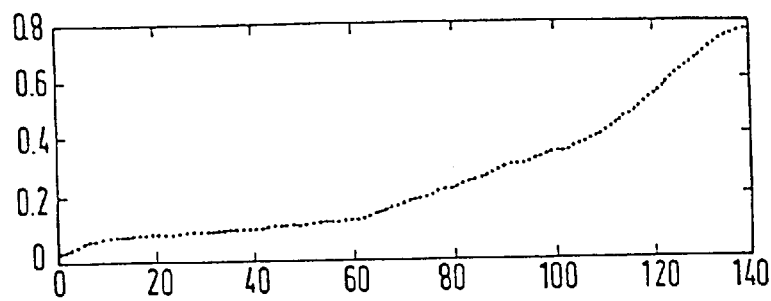
FIG. 4, as an example for one lobe of the duplex antenna is a graphical illustration of, sorted by size and standardized over am angle-independent sorting index n.
Figure 5:
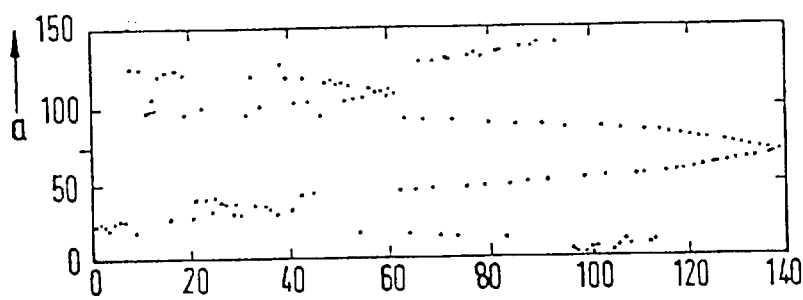
FIG. 5 is a graph showing the relationship of the angle index a to the sorting indices n of FIG. 4.

In the first exemplary embodiment of the invention, the standardized graph values of the duplex antenna graph are stored in memory separately in accordance with the individual antenna lobes, in the form of sorted lists. Table 1 shows an excerpt from such a list, in which the respective associated angle index a is shown, along with the standardized, sorted graph values of one lobe. By resorting in accordance with the magnitude of the graph values, the angle indices appear in a random order. FIG. 4 shows a graph of the graph values, sorted by size, of one antenna lobe over a progressive sorting index n. On FIG. 5, the angle indices pertaining to FIG. 4 are plotted over the same sorting index n, and as a result the random order of the angle indices of Table 1 becomes visible along the abscissa.

The evaluating computer 19 now, as indicated by block 73, first carries out a standardization of the received amplitude values of the radar target; the standardization is equivalent to that chosen for the duplex antenna graph. Then, in block 74, for each reception path or in other words each antenna lobe within the associated sorted list, it looks for the particular standardized graph value that comes closest to the standardized amplitude value received in this lobe.

Table 2 shows this as an example for a received, standardized amplitude value of 0.6. In block 75, a number of graph values, in this case nine of them for example, that are located in a predetermined range around the standardized amplitude value sought are now selected. The associated angle indices can be considered to be possible angle indices for the detected radar target. This selection method is performed for all the received amplitude values from what in this case are three antenna lobes, so that a plurality of possible angle indices is then obtained, in this case three of them.

TABLE II

GRAPH VALUES VERSUS ANGLE INDICES

| Graph Values | Possible Angle Indices |
|---|---|
| 0.5253 | 56.0000 |
| 0.5389 | 75.0000 |
| 0.5526 | 57.0000 |
| 0.5560 | 74.0000 |
| 0.5733 | 73.0000 |
| 0.5772 | 58.0000 |
| 0.5898 | 72.0000 |
| 0.5986 | 59.0000 |
| 0.6048 | 71.0000 |
| 0.6145 | 60.0000 |
| 0.6169 | 70.0000 |
| 0.6262 | 69.0000 |
| 0.6301 | 61.0000 |
| 0.6340 | 68.0000 |
| 0.6411 | 62.0000 |

Figure 6A:
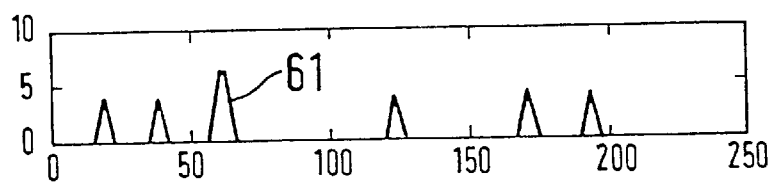
FIGS. 6a–d, are graphical illustrations showing a weighting operation for determining the most likely angle of a radar target.
Figure 6B:
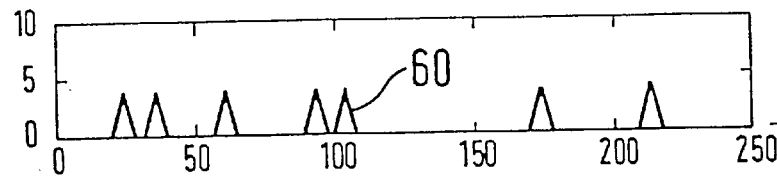
Figure 6C:
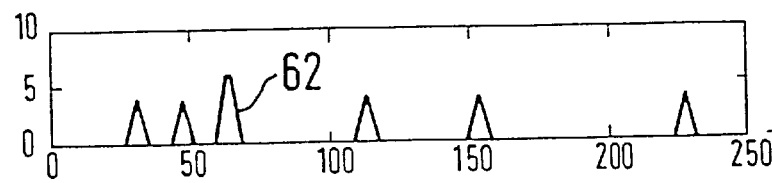
Figure 6D:
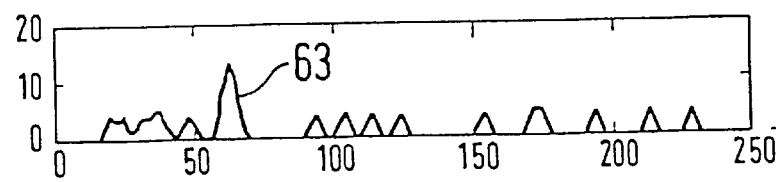
Figure 7:
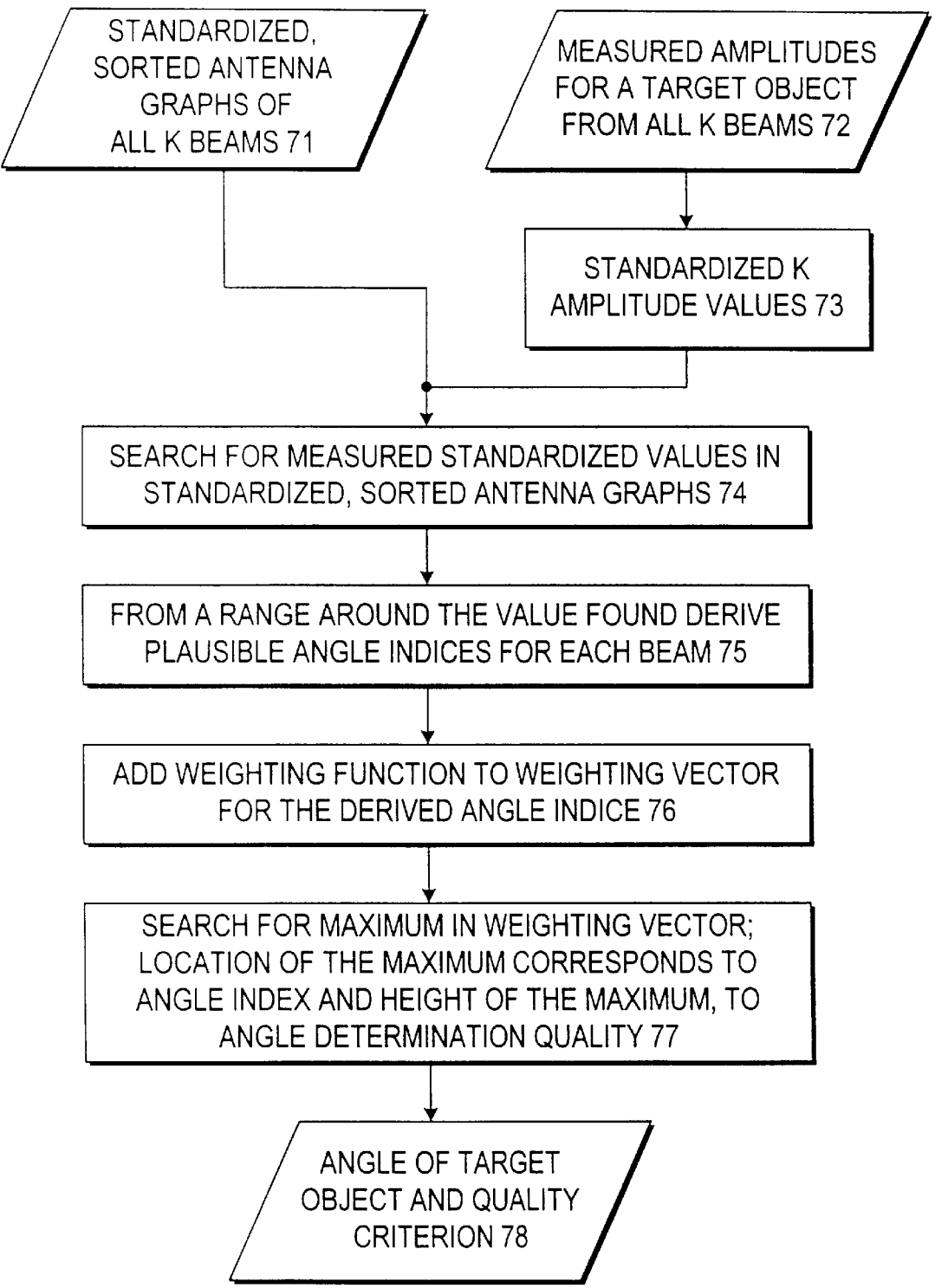
FIG. 7 is a flow chart to explain a first exemplary embodiment.

To decide at what angle the detected radar target is now in fact located, in block 76 all the angle indices previously selected as being possible are weighted with a weighting function, which is preferably selected to be triangular. FIGS. 6a–c show the thus-weighted angle indices over an axis for all the angle indices available for selection, specifically once for the left reception path, once for the middle reception path, and once for the right reception path. The triangles 61 and 62 are located higher than the triangle 60, for example. This is the result of a superposition of weighting functions in cases 61 and 62, because there, angle indices located close together have been selected and weighted. FIG. 6d finally shows the result of adding together the three views located one above the other, that is, the sum of the weighting functions of all the reception paths each for one angle index. As can be seen, a maximum appears at 63, because the weighting functions are superimposed on one another here in a narrowly defined angular range. This means that the angle index or angle index range located here was selected most often as a possible angle index. The maximum in the sum of weighting functions is thus, in accordance with block 77, the decision criterion that the associated angle is determined as the most likely angle of the radar target. The height of the maximum simultaneously forms a quality criterion for the angle decision being made, which is all the more certain the higher the absolute value of the maximum is located.

As an alternative to the triangular weighting functions, all functions that produce a pronounced maximum can be used. In this sense, a gaussian or a $\cos^2$ function, for instance, can also be used as a weighting function.

In block 78, the angle determined in this way is furnished, as a likely angle for the target object, to a further signal processing.

Figure 10:
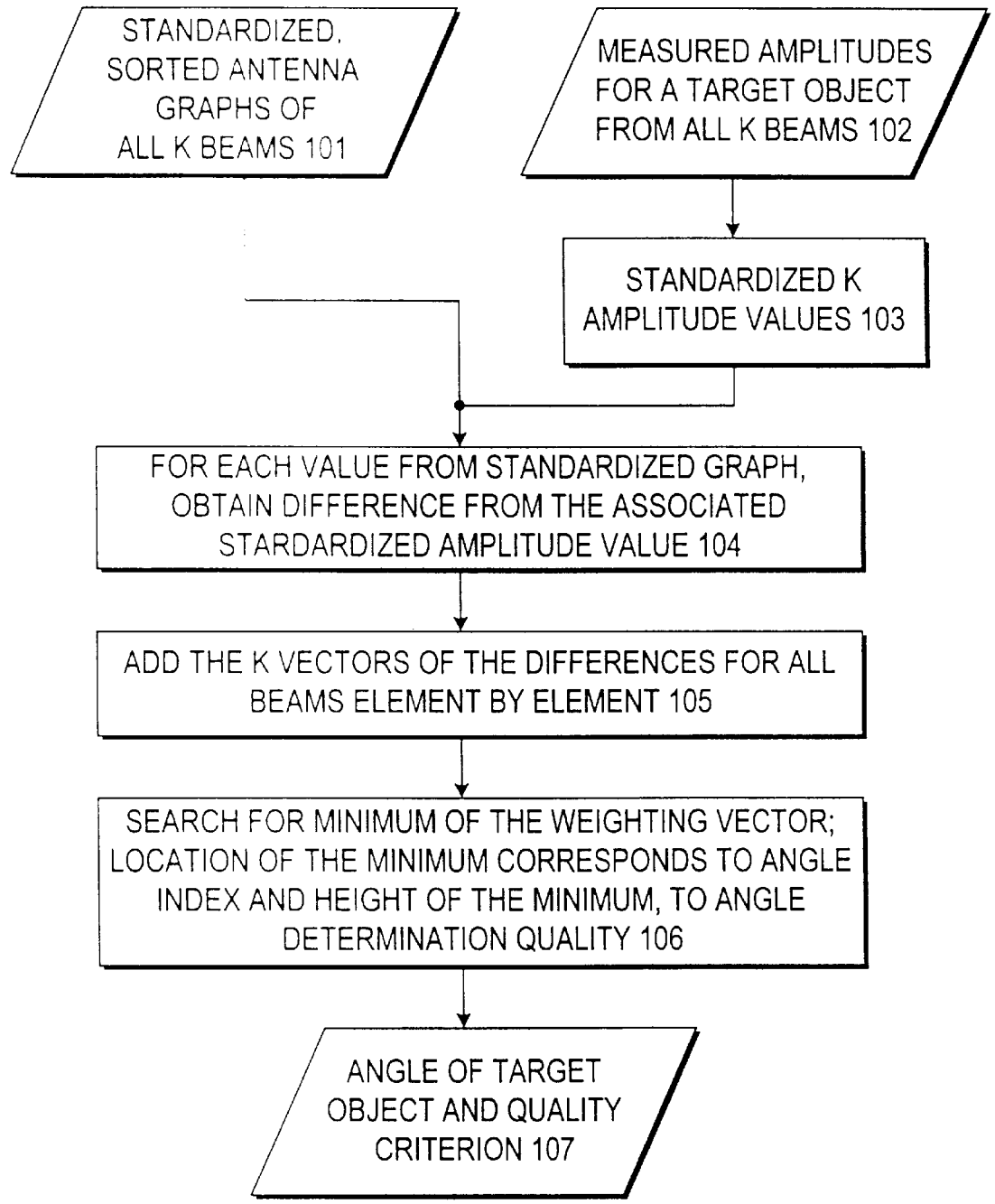
FIG. 10 is a flow chart to explain a second exemplary embodiment of the invention.

A second exemplary embodiment of the invention is based on the same technological apparatus, but it uses a different algorithm to evaluate the echo amplitudes picked up in the at least two reception channels. Blocks 102 and 103 in FIG. 10 are identical to blocks 72 and 73 of FIG. 7; that is, in this exemplary embodiment as well, the echo amplitudes picked up in the individual reception channels of the radar system are first standardized. Unlike the first exemplary embodiment, the standardized graph values of the duplex antenna graph here no longer need to be stored in memory in a list sorted by size of the quantity, however, but instead can be stored in memory (101) in the form in which they have been measured, for example, in accordance with the angle index. In block 104, a differential function is now formed for each reception channel; this function contains the quantitative difference between the echo amplitude picked up in that channel and all the graph values of the duplex antenna graph of this lobe. Expressed in terms of a formula, these differential functions are as follows:

$$L(a) = \text{quantity}[nl(a) - El]$$

$$M(a) = \text{quantity}[nm(a) - Em]$$

$$R(a) = \text{quantity}[nr(a) - Er]$$

in which nl(a), nm(a) and nr(a) are the standardized graph values for the left, middle and right curves or lobes of the duplex antenna graph of FIG. 3;

El, Em and Er are the standardized echo amplitudes that have been picked up in the left, middle and right reception channels; and L(a), M(a) and R(a) designate the aforementioned differential functions.

Figure 8:
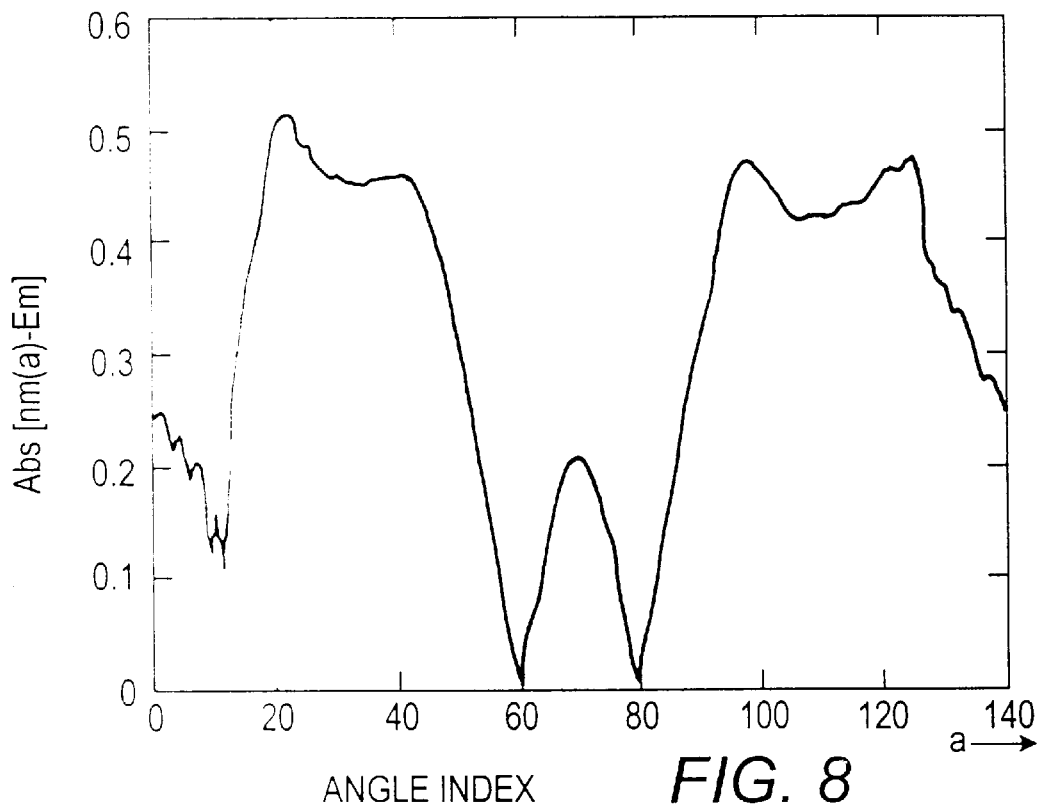
FIG. 8 is a graphical illustration of the quantitative behavior of a differential function between a standardized amplitude of a received signal and the standardized graph values of one lobe of the duplex antenna graph.

FIG. 8 shows one such differential function, for instance for the middle reception channel and for a radar target at an angle that is equivalent to the angle index a=60. As can be seen, the differential function at this point has a minimum that is a clue to the angle sought. The ambiguity that exists here because of the second minimum at an angle index a=80 is eliminated by an ensuing addition of the differential functions of all the reception channels in block 105.

Figure 9:
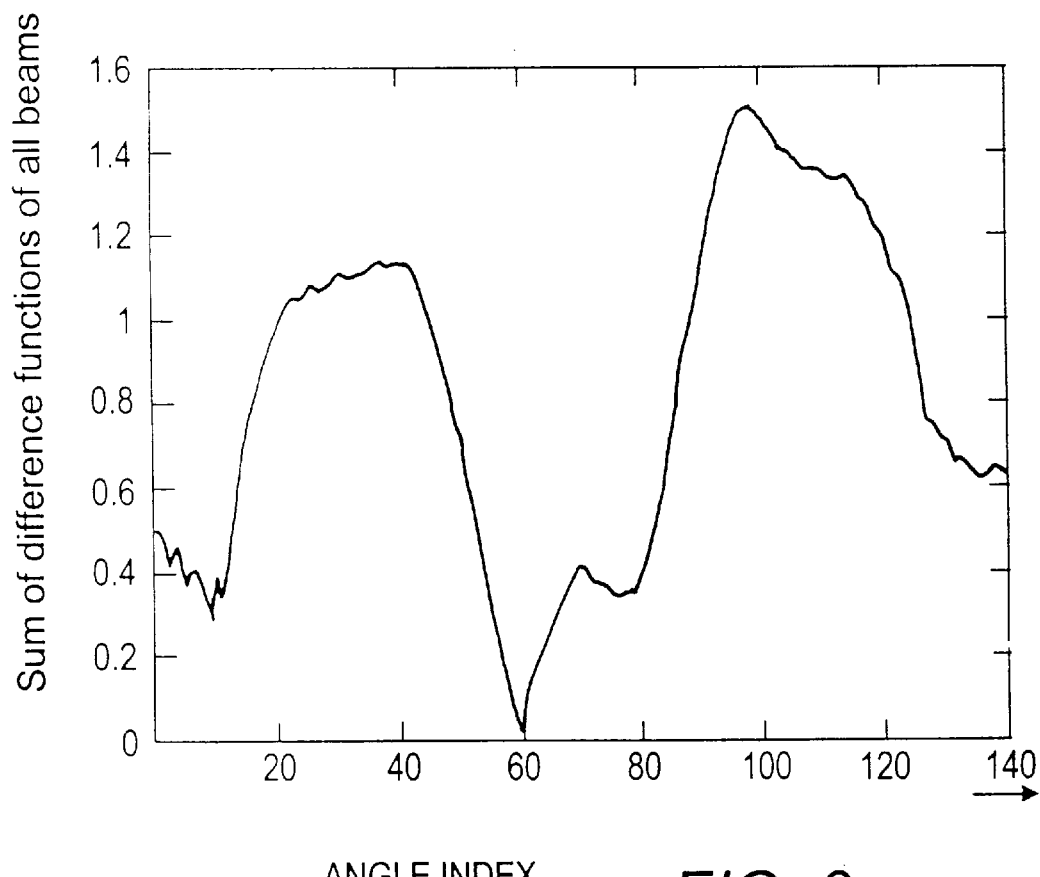
FIG. 9 is a graphical illustration of the sum of all the differential functions from the individual antenna lobes.

FIG. 9 shows a graph of this new summation function, obtained by adding together all the differential functions. As a result of the superposition, a minimum now remains only at the angle index a=60 assumed in this example. To generalize, accordingly in block 106 the angle index at which the summation function of all the differential functions has its minimum is determined to be the most likely angle of the radar target. At the same time, the magnitude of this minimum is in turn a quality criterion for the angle decision being made. The more clearly pronounced the minimum is, the more certain it is that the determined angle or angle index is the actual angle of the detected radar target. In block 107, this angle is also handed over for further signal processing by the system.

In accordance with its basic concept described above, the invention can be realized with any multiple-beam radar system, regardless of how the multiple-beam aspect is achieved. For instance, this can be done by means of a plurality of separate antennas, but it can equally readily be accomplished by means of one antenna with a plurality of transmission and/or reception elements. The antenna or antennas may also have all the beam-forming elements, such as lenses, reflectors, absorbers, etc. Moreover, the method according to the invention and its realization are independent of the radar method used; that is, it can be employed in both pulsed and continuous-broadcasting radar methods.

The radar system described here is used in particular in conjunction with vehicle speed control in motor vehicles. There, it allows one to judge whether a detected radar target is in the same lane as one's own vehicle, or not. Regardless of this, however, the described method can also be used in all other applications in which determining the angle of a radar target is desired. For instance, it can also be used to determine the elevation angle of a target in flight.

The measurable angle range can be determined by the selection of the lobe width of the antenna or antennas. It is also possible, by using optionally a plurality of antennas, arranged in a circle, for instance, to measure an arbitrarily large angular range up to 360°.

Not least, the method is independent of the further signal processing of the radar system, which is preferably done by means of a Fourier transform in the frequency range.

The amplitude values used to determine the angle, however, can be obtained both in the time range and in the frequency range.

In accordance with FIG. 1, the method is especially well-suited to parallel processing of the signals in the at least two reception channels. However, sequential processing in a multiplexed signal processing train is equally conceivable.

With regard to the antenna graph stored in memory, the duplex antenna graph presented is preferred, since it is by far the most suitable for the way in which the radar picks up its signals. Depending on the beam characteristic design and/or on suitably corrected selection functions, however, it is also possible to use "normal", or in other words simple, antenna graphs.

We claim:

1. A method for determining an azimuth and/or elevational angle at which a radar target is located relative to a reference system with a multiple-beam radar system generating at least two radar beams, said method comprising the steps of:

a) receiving an echo signal from said radar target produced by each of said radar beams in said multiple-beam radar system;

b) standardizing amplitudes of each of said echo signals received by said multiple-beam radar system to form standardized amplitudes;

c) storing a standarized antenna graph for each of said radar beams, said standardized antenna graph comprising graph values indicative of a functional relationship between said standardized amplitude of said echo signal and said angle, in a memory of a computer;

d) comparing the standardized amplitudes of respective ones of said echo signals with the graph values of the respective standardized antenna graphs stored in said memory for said radar beams to obtain comparison results for each of said radar beams;

e) linking the comparison results which were determined during the comparing of step d) for at least two of said radar beams together to form combined comparison results; and f) determining a final value of said angle at which said radar target is located from said combined comparison results by means of a minimum or maximum criterion.

2. The method as defined in claim 1, wherein said antenna graph is a duplex antenna graph.

3. The method as defined in claim 1, wherein a sum of the graph values at a predetermined one of said angles of all of said radar beams is one in the standarized antenna graph.

4. The method as defined in claim 3, wherein said standardizing of said amplitudes of each of said echo signals is such that a sum of the standardized amplitudes at a predetermined one of said angles of all of said radar beams is one.

5. The method as defined in claim 1, wherein the a product of graph values at a predetermined one of said angles for all of said radar beams is one in the standarized antenna graph.

6. The method as defined in claim 5, wherein said standardizing of said amplitudes of each of said echo signals is such that a product of the standardized amplitudes at a predetermined one of said angles of all of said radar beams is one.

7. The method as defined in claim 1, wherein said graph values of said standardized antenna graph are stored in said memory as sorted, standardized graph values and further comprising, during said comparing, selecting a number (n) of the sorted, standardized graph values within a predetermined interval of the standardized amplitude of the echo signal for each of said radar beams as matching graph values.

8. The method as define in claim 7, further comprising determining angle values associated with said matching graph values for each of said radar beams, weighting angles values associated with said matching graph values with weighting functions, adding the weighting functions for equal angle values of at least two of said radar beams to each other to form a sum and selecting said angle for which said sum is a minimum or a maximum in relation to said sums for all other angles as a most probable angle at which said radar target is located.

9. The method as defined in claim 1, further comprising forming, for each of said radar beams, a differential function, each of said differential functions being indicative of a difference between the standardized amplitude of said echo signal for one of said radar beams and said standardized graph values for all possible angle values of said one of said radar beams; adding said differential functions for all of said radar beams together to form a sum function; and determining an angle value at which said sum function is minimum as a most probable angle at which said radar target is located.

10. A multiple-beam radar system for a motor vehicle comprising means for standardizing amplitudes of echo signals produced from a radar target by at least two radar beams propagated toward said radar target;

means for storing a standardized antenna graph for each of said radar beams propagated from the radar system in a memory;

means for comparing the standardized amplitudes of each of the echo signals with the respective graph values for the corresponding radar beam, stored in memory, to obtain comparison results for each of said radar beams; and means for determining, based on comparison results from said means for comparing, a most probable angle at which said radar target is located in relation to said multi-beam radar system.

* * * * *